United States Patent
Pantelidou et al.

(10) Patent No.: US 12,279,315 B2
(45) Date of Patent: Apr. 15, 2025

(54) ENHANCED REPORT FOR RANDOM ACCESS CHANNEL

(71) Applicant: Nokia Technologies Oy, Espoo (FI)

(72) Inventors: Anna Pantelidou, Antony (FR); Samuli Turtinen, Ii (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 384 days.

(21) Appl. No.: 17/907,584

(22) PCT Filed: Apr. 9, 2020

(86) PCT No.: PCT/CN2020/084067
§ 371 (c)(1),
(2) Date: Sep. 28, 2022

(87) PCT Pub. No.: WO2021/203393
PCT Pub. Date: Oct. 14, 2021

(65) Prior Publication Data
US 2023/0156806 A1    May 18, 2023

(51) Int. Cl.
*H04W 74/08* (2024.01)
*H04W 74/00* (2009.01)
*H04W 74/0833* (2024.01)

(52) U.S. Cl.
CPC ..... *H04W 74/0833* (2013.01); *H04W 74/002* (2013.01)

(58) Field of Classification Search
CPC ........... H04W 74/004; H04W 74/0833; H04W 74/002
See application file for complete search history.

(56) References Cited

U.S. PATENT DOCUMENTS

2019/0132066 A1   5/2019  Park et al.
2020/0260485 A1*  8/2020  Lei .............. H04W 72/23
(Continued)

FOREIGN PATENT DOCUMENTS

CN    101969662 A    2/2011
CN    103096355 A    5/2013
(Continued)

OTHER PUBLICATIONS

Notice of Allowance received for corresponding Japanese Patent Application No. 2022-561550, dated Mar. 12, 2024, 2 pages of Notice of Allowance and no page of translation available.
(Continued)

*Primary Examiner* — Liton Miah
(74) *Attorney, Agent, or Firm* — Nokia Technologies Oy (57) ABSTRACT

Example embodiments of the present disclosure relate to devices, methods, apparatuses and computer readable storage media of enhancing a report for random access channel (RACH). The method comprises in accordance with a determination that a random access attempt in a random access process for accessing a second device based on configuration information is performed, determining an entry for recording the random access attempt, the entry at least comprising fallback information indicating whether a change associated with the random access attempt has occurred; generating a report for the random access process at least based on the entry; and causing the report to be transmitted to the second device. In this way, with the UE RACH report, the network device may achieve a targeted optimization for the configuration for RA process, which may improve the efficiency of the RA process and decrease the cost due to a multiple of fallback.

24 Claims, 6 Drawing Sheets

(56) References Cited

U.S. PATENT DOCUMENTS

2022/0132589 A1* 4/2022 Bao .................. H04W 74/0833
2023/0389072 A1* 11/2023 Jang ................. H04W 74/0833

FOREIGN PATENT DOCUMENTS

| CN | 107006037 A | 8/2017 |
|---|---|---|
| WO | 2018/204863 A1 | 11/2018 |
| WO | 2019/108114 A1 | 6/2019 |
| WO | 2020/001478 A1 | 1/2020 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

International Search Report and Written Opinion received for corresponding Patent Cooperation Treaty Application No. PCT/CN2020/084067, dated Dec. 30, 2020, 9 pages.

"Further considerations on RACH optimization", 3GPP TSG RAN WG2#109-e, R2-2000805, Agenda: 6.12.4, ZTE Corporation, Feb. 24-Mar. 6, 2020, pp. 1-7.

"RACH optimization in NR", 3GPP TSG RAN WG2 #106, R2-1906865, Agenda: 11.12.5, Ericsson, May 13-17, 2019, 7 pages.

Office Action for Chinese Application No. 202110378751.7 dated Mar. 20, 2024.

Office action received for corresponding Japanese Patent Application No. 2022-561550, dated Aug. 22, 2023, 3 pages of office action and 5 pages of translation available.

"Stage-2 running CR for 2-step RACH", 3GPP TSG-RAN WG2 Meeting #108, R2-1915889, Nokia, Nov. 18-22, 2019, pp. 1-9.

"RACH report for NR RACH optimization", 3GPP TSG-RAN WG3 Meeting # 106, R3-197106, Agenda: 10.2.3.2, ZTE, Nov. 18-22, 2019, 3 pages.

Office Action received for corresponding Indian Patent Application No. 202247063572, dated Jan. 3, 2023, 6 pages.

Office action received for corresponding Chinese Patent Application No. 202110378751.7, dated Jan. 11, 2024, 9 pages of office action and no page of translation available.

Extended European Search Report received for corresponding European Patent Application No. 20930250.4, dated Feb. 2, 2023, 12 pages.

"On Reporting Random Access-related Information", 3GPP TSG-RAN WG2 Meeting #107, R2-1909210, Agenda: 11.12.2, Samsung, Aug. 26-30, 2019, 3 pages.

"Corrections for RACH Records Structure", 3GPP TSG RAN WG2#109-e, R2-2000105, Agenda: 6.12.4, CATT, Feb. 24-Mar. 6, 2020, 19 pages.

* cited by examiner

ENHANCED REPORT FOR RANDOM ACCESS CHANNEL

RELATED APPLICATION

This application was originally filed as PCT Application No. PCT/CN2020/084067 on Apr. 9, 2020, which is incorporated herein by reference in its entirety.

FIELD

Embodiments of the present disclosure generally relate to the field of telecommunication and in particular, to devices, methods, devices and computer readable storage media of providing an enhanced report for random access channel (RACH).

BACKGROUND

In wireless communications, a terminal device can perform a random access (RA) process with a network device to obtain access to a wireless network. Currently, two types of random access processes are supported: 4-step RA type and 2-step RA type. Both types of RA processes support contention-based random access (CBRA) and contention-free random access (CFRA).

In 4-step CBRA, a terminal device can start the RACH process by sending a RA Preamble to a network device. The message for transmitting the RA Preamble may be referred to as "MSG1". If the network device receives the RA Preamble successfully, the network device may respond with a Random Access Response (RAR) which contains the identifier of the detected preamble, the time-advance, a temporary Cell-RadioNetworkTemporaryIdentifier (C-RNTI) and an uplink grant for scheduling a PhysicalUplinkSharedChannel (PUSCH) transmission by the terminal device. The message for transmitting the RAR may be referred to as "MSG2". Then the terminal device may send a scheduled transmission to the network device, which may be referred to as "MSG3". If the network device receives the scheduled transmission, the network device may send a contention resolution message to indicate whether there was contention or whether the transmission by the terminal device was successful, which may be referred to as "MSG4".

In 2-step CBRA, the number of round-trips required until the RACH process is reduced from 2 round-trips to 1. This is achieved by sending both "MSG1" and "MSG3" in a message called "MSGA" and by further combining "MSG2" and "MSG4" into a message called "MSGB".

SUMMARY

In general, example embodiments of the present disclosure provide a solution of enhanced report for RACH.

In a first aspect, there is provided a first device. The first device comprises at least one processor; and at least one memory including computer program codes; the at least one memory and the computer program codes are configured to, with the at least one processor, cause the first device at least to in accordance with a determination that a random access attempt in a random access process for accessing a second device based on configuration information is performed, determine an entry for recording the random access attempt, the entry at least comprising fallback information indicating whether a change associated with the random access attempt has occurred; generate a report for the random access process at least based on the entry; and cause the report to be transmitted to the second device.

In a second aspect, there is provided a first device. The first device comprises at least one processor; and at least one memory including computer program codes; the at least one memory and the computer program codes are configured to, with the at least one processor, cause the first device at least to in accordance with a determination that a random access attempt in a random access process for accessing a second device is performed, determine an entry for recording the random access attempt, the entry comprising at least one of the following: a type of the random access attempt, a type of contention mechanism for random access attempt, at least one random access parameter of the random access attempt, an identifier of the random access attempt, an identifier of a beam on which the random access attempt is performed and fallback information of the random access attempt, and generate a report for the random access process based on the entry.

In a third aspect, there is provided a second device. The second device comprises at least one processor; and at least one memory including computer program codes; the at least one memory and the computer program codes are configured to, with the at least one processor, cause the first device at least to receive, from a first device, a report for a random access process perform at the first device for accessing the second device based on configuration information, the report at least comprising an entry for recording a random access attempt in the random access process, the entry at least comprising a fallback information indicating whether a change associated with the random access attempt has occurred; and update the configuration information based on the report.

In a fourth aspect, there is provided a method. The method comprises in accordance with a determination that a random access attempt in a random access process for accessing a second device based on configuration information is performed, determining an entry for recording the random access attempt, the entry at least comprising fallback information indicating whether a change associated with the random access attempt has occurred; generating a report for the random access process at least based on the entry; and causing the report to be transmitted to the second device.

In a fifth aspect, there is provided a method. The method comprises in accordance with a determination that a random access attempt in a random access process for accessing a second device is performed, determining an entry for recording the random access attempt, the entry comprising at least one of the following: a type of the random access attempt, a type of contention mechanism for random access attempt, at least one random access parameter of the random access attempt, an identifier of the random access attempt, an identifier of a beam on which the random access attempt is performed and fallback information of the random access attempt, and generating a report for the random access process based on the entry.

In a sixth aspect, there is provided a method. The method comprises receiving, from a first device, a report for a random access process perform at the first device for accessing the second device based on configuration information, the report at least comprising an entry for recording a random access attempt in the random access process, the entry at least comprising a fallback information indicating whether a type of the random access attempt is changed; and updating the configuration information based on the report.

In a seventh aspect, there is provided an apparatus comprising means for in accordance with a determination that a random access attempt in a random access process for accessing a second device based on configuration information is performed, determining an entry for recording the random access attempt, the entry at least comprising fallback information indicating whether a change associated with the random access attempt has occurred; means for generating a report for the random access process at least based on the entry; and; and means for causing the report to be transmitted to the second device.

In an eighth aspect, there is provided an apparatus comprising means for in accordance with a determination that a random access attempt in a random access process for accessing a second device is performed, determining an entry for recording the random access attempt, the entry comprising at least one of the following: a type of the random access attempt, a type of contention mechanism for random access attempt, at least one random access parameter of the random access attempt, an identifier of the random access attempt, an identifier of a beam on which the random access attempt is performed and fallback information of the random access attempt, and means for generating a report for the random access process based on the entry.

In a ninth aspect, there is provided an apparatus comprising means for receiving, from a first device, a report for a random access process perform at the first device for accessing the second device based on configuration information, the report at least comprising an entry for recording a random access attempt in the random access process, the entry at least comprising a fallback information indicating whether a type of the random access attempt is changed; and means for updating the configuration information based on the report.

In a tenth aspect, there is provided a computer readable medium having a computer program stored thereon which, when executed by at least one processor of a device, causes the device to carry out the method according to the fourth aspect.

In an eleventh aspect, there is provided a computer readable medium having a computer program stored thereon which, when executed by at least one processor of a device, causes the device to carry out the method according to the fifth aspect.

In a twelfth aspect, there is provided a computer readable medium having a computer program stored thereon which, when executed by at least one processor of a device, causes the device to carry out the method according to the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Figure 1:
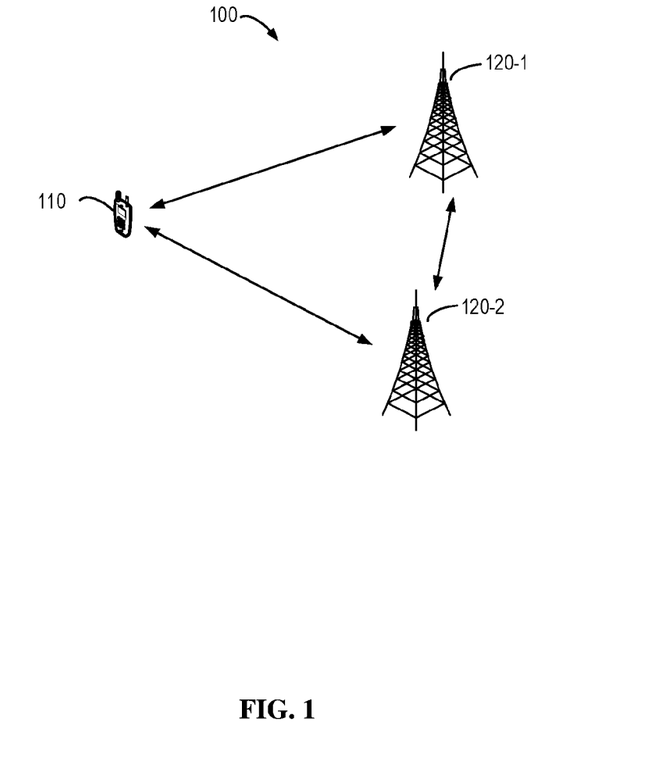
FIG. 1 shows an example environment in which example embodiments of the present disclosure can be implemented.

FIG. 1 shows an example communication network 100 in which embodiments of the present disclosure can be implemented. As shown in FIG. 1, the communication network 100 comprises a terminal device 110 (hereafter also referred to as a first device 110). The communication network 100 further comprises network devices 120-1 and 120-2 (hereafter may also be collectively referred to as the network device 120 or referred to as a second device 120-1 and a third device 120-2, respectively). The terminal device 110 may communicate with the network device 120. In some cases, if the communication network 100 may support "Centralized Unit/Distributed Unit" architecture, the network device 120-1 may also be referred to as a Centralized Unit (gNB-CU) and the network device 120-2 may also be referred to a Decentralized Unit (gNB-DU). The network device 120-1 and network device 120-2 may communicate with each other. Although FIG. 1 shows the gNB-CU 120-1 is connected to a single gNB-DU 120-2, It is to be understood that a large number of gNB-DUs can be connected to the gNB-CU 120-1. It is also to be understood that the number of network devices and terminal devices shown in FIG. 1 is given for the purpose of illustration without suggesting any limitations.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation of communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, in wireless communications, a terminal device can perform a RA process with a network device to obtain access to a wireless network. Currently, two types of random access processes are supported: 4-step RA type and 2-step RA type. Both types of RA processes support CBRA and CFRA.

In 4-step CBRA, a terminal device can start the RACH process by sending a RA Preamble to a network device. The message for transmitting the RA Preamble may be referred to as "MSG1". If the network device receives the RA Preamble successfully, the network device may respond with a RAR which contains the identifier of the detected preamble, the time-advance, a temporary C-RNTI and an uplink grant for scheduling a PUSCH transmission by the terminal device. The message for transmitting the RAR may be referred to as "MSG2". Then the terminal device may send a scheduled transmission to the network device, which may be referred to as "MSG3". If the network device receives the scheduled transmission, the network device may send a contention resolution message to indicate whether there was contention or whether the transmission by the terminal device was successful, which may be referred to as "MSG4".

In 2-step CBRA, the number of round-trips required until the RACH process is reduced from 2 round-trips to 1. This is achieved by sending both "MSG1" and "MSG3" in a message called "MSGA" and by further combining "MSG2" and "MSG4" into a message called "MSGB". Due to its property of minimizing RACH channel occupancy until successful RACH access, 2-step RACH has been also used for Listen Before Talk (LBT) in unlicensed access. Furthermore, in addition to CBRA, a CFRA process may also be supported.

In 2-step RACH, a failed attempt can be either because the "MSGA" (both preamble and PUSCH payload) was not received or because the payload was not received by the network device.

Failure of the "MSGA" payload can be for example because the message size chosen by the terminal device was too "big" to be successfully transmitted for given channel conditions if the buffer threshold and/or pathloss/power threshold for preamble group selection is not set properly. In 2-step RACH, the terminal device can select the preamble group A or B by comparing buffer size to a threshold parameter ra-MsgASizeGroupA. If the buffer size is greater than the parameter ra-MsgASizeGroupA and if preamble group B has been configured, the terminal device may select the preambles of group B.

However, if the network device cannot receive "MS GA" payload reception, the network device may not know what size of "MSGA" was selected by the terminal device if the preamble detection also failed. While if the preamble can be detected by the network device, the network device may be aware of the corresponding payload. Having knowledge of the size of "MSGA" together with information on the outcome of the "MSGA" transmission can contribute to optimizing the "ra-MsgASizeGroupA" parameter as well as the used physical layer parameters for PUSCH size of "MSGA", preambles and preamble groups A and B. For example, by means of reconfiguring the threshold parameter "ra-MsgASizeGroupA" or reconfigure the PUSCH Configuration for the "MSGA" payload, the network device may allow the terminal to choose different preambles for certain message sizes.

Furthermore, there is a plurality of fallback mechanisms in 2-step RACH. Herein the term "fallback" may refer to a switching of the type of a RA attempt. For example, the 2-step CBRA/CFRA RACH attempt may be switched to a 4-step CBRA/CFRA RACH, if the 2-step CBRA/CFRA RACH attempt is not successful. Moreover, if no suitable beam is found, the 4-step CFRA RACH attempt may be switched to a 4-step CBRA RACH or the 2-step CFRA attempt may be switched to a 2-step CBRA RACH.

Fallbacks may cost since they increase the delay and the number of transmissions before the RACH is successful. This could be especially problematic on LBT where channel occupancy time is more critical. The network device may optimize resources if the network device can be aware of the type of fallback that occurred. Not all fallbacks are visible to the network device unless the terminal device records this information.

Furthermore, it is possible that the fallback cannot occur in a case where the 2-step RACH resources are configured on a Bandwidth Part (BWP) where 4-step CBRA resources are not configured. Even if the 2-step RACH attempt is not successful, the RACH attempt cannot be switched to the 4-step RACH attempt in this case.

The UE RACH Report can be sent as part of an RLF report or individually. The terminal device can store more than one RACH process related UE RACH report. The report may reflect some parameters associated with the RACH process such as preamble, index of Synchronization Signal Block (SSB) or index of Cell Specific Reference Signal (CSI-RS), etc. The network device may optimize the RACH process based on the UE RACH report. However, 2-step RACH was not considered as part of RACH optimization.

For a CU-DU architecture, RACH Configuration Conflict detection and resolution function is located at the gNB-DU. A gNB-DU needs to know the PRACH Configuration of some or all cells that are neighbours to another cell subject to RACH configuration conflict in order to effectively choose a new PRACH Configuration for the cell in conflict. The UE RACH report will be transmitted from the terminal device to the gNB-CU. Then the UE RACH report will be exchanged from gNB-CU to gNB-DU.

Therefore, the embodiments of the present disclosure propose an approach for an enhanced UE RACH report, especially for the UE RACH report for 2-step RACH. The report may at least comprise information about fallback, such as whether a fallback has occurred or a reason for the fallback. In this way, a RACH optimization can be achieved based on the enhanced UE RACH report.

Figure 2:
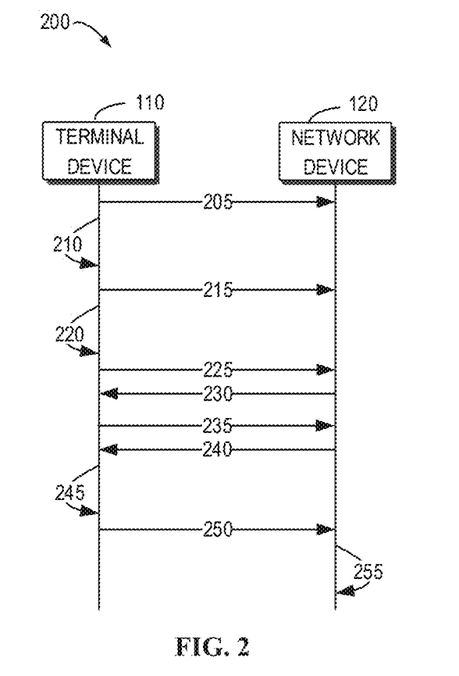
FIG. 2 shows a signaling chart illustrating a process of providing an enhanced report for RACH according to some example embodiments of the present disclosure.

Principle and implementations of the present disclosure will be described in detail below with reference to FIGS. 2 to 8. FIG. 2 shows a signaling chart illustrating a process of providing an enhanced report for RACH according to some example embodiments of the present disclosure. For the purpose of discussion, the process 200 will be described with reference to FIG. 1. The process 200 may involve the terminal device 110 and the network device 120.

In a case where a RACH process is to be initiated at the terminal device 110, the terminal device 110 may start to perform a RA attempt based on resources for the RACH process. In a case where, a 2-step RA attempt is to be performed at the terminal device 110, as shown in FIG. 2, the terminal device 110 may transmit 205 a "MSGA" to the network device 120. The terminal device 110 may log the transmission of "MSGA" after the "MS GA" is transmitted. If the terminal device 110 cannot receive any response from the network device 120 after the transmission of the "MS GA", this 2-step RA attempt can be considered as a failed RA attempt.

It is to be understood that this 2-step RA attempt may be the first RA attempt in a RA process. It is also possible that at least one previous 2-step RA attempt has been performed before this 2-step RA attempt.

For this failed 2-step RA attempt, the terminal device 110 may determine 210 an entry for recording the RA attempt. The entry may comprise information for describing the RA attempt. The report may comprise at least one of a type of the RA attempt (e.g., 2-step versus 4-step), a type of contention mechanism for the RA attempt (e.g., CBRA versus CFRA), one or more random access parameters of the RA attempt such as the preamble used or whether the preamble type is group A or group B and a size of the "MS GA" payload, an identifier of the RA attempt, an index of the beam on which the RA attempt is performed such as a Beam index, that can be an SSB Index or a CSI-RS index, and a fallback indication.

If a fallback has not occurred after this 2-step RA attempt and the subsequent 2-step RA attempt will be performed, the fallback indication may be identified with a symbol identifying lack of fallback, such as a "–", in the UE RACH Report.

As an option, with respect to the random access parameter of the RA attempt, the UE RACH report may only indicate one of the preamble type and a size of the "MS GA" payload. If the terminal device 110 indicates in the UE RACH report the size of the payload transmitted in "MSGA", the network device 120 may deduce a type of preamble group (group A or group B) that was used. If the terminal device 110 indicates in the UE RACH report the type of preamble, the network device 120 may obtain information on the range of the "MS GA" payload.

Thus, for this failed 2-step RA attempt, an example entry may be represented as "2-step CBRA, payload size, fallback: –, Beam index, #RACH attempts". For example, the beam index may be a SSB index or CSI-RS index and the #RACH attempts corresponds to the number of RACH attempts on the beam index.

Since the previous 2-step RA attempt has failed and the fallback has not occurred, the terminal device 110 may continue to perform a subsequent 2-step RA attempt. For example, as shown in FIG. 2, in the subsequent 2-step RA attempt, the terminal device 110 may further transmit 215 a "MSGA" to the network device 120. The terminal device 110 may log the transmission of "MSGA" after the "MSGA" is transmitted. If the terminal device 110 still cannot receive a response from the network device 120, the subsequent 2-step RA attempt can be considered as a failed RA attempt.

In some example embodiments, if the terminal device 110 determines that the number of times that the "MSGA" was transmitted until this subsequent 2-step RA attempt exceeds a threshold number, the terminal device 110 may not be allowed to further perform the 2-step RA attempt. That is, a fallback may occur after this subsequent 2-step RA attempt. In this case, the terminal device 110 may determine 220 a further entry for recording the subsequent 2-step RA attempt.

Thus, for the subsequent 2-step RA attempt, an example of the further entry may be represented as "2-step CBRA, payload, fallback: #failed MSGA Threshold, Beam index, RACH attempts".

A 4-step RA attempt may be initiated at the terminal device 110. The terminal device 110 may transmit 225 a "MSG1". If the terminal device 110 receives 230 a response, namely "MSG2", the terminal device 110 may transmit 235 a "MSG3" to the network device 120. If the transmission is successful, the network device 120 may transmit 240 a contention resolution message to indicate a success of the transmission.

If the terminal device 110 receives the message indicating the success of the random access, the terminal device 110 may also determine 245 an entry for the 4-step RA attempt. For example, the entry may be represented as "4-step CBRA, fallback: success, Beam index, RACH attempts, success". Furthermore, the entry may comprise indications of timestamps on the time that "MSGA" is transmitted and the time when RA process succeeded. This can help the network determine how long took for the RA process to successfully complete. The additional entry "success" can indicate success of the RACH procedure in case RACH success is not tied to a fallback.

Based on the entries determined in the RA process, the terminal device 110 may generate a report associated with the RA process. The terminal device 110 may further transmit 250 the report to the network device 120. In some example embodiments, the terminal device 110 may transmit the report only when the network device 120 requires the report or when specific information is recorded in the report. The UE may log a number of RACH procedures before it indicates to the network device availability of a UE RACH Report so that the network device can request it. The network device 120 may update 255 configuration information of the RA process based on the report.

As mentioned above, for a CU-DU architecture, where the network device 120-1 is to be referred to as a gNB-CU and the network device 120-2 is to be referred to a gNB-DU, the report may be transmitted to the network device 120-1 and forwarded from the network device 120-1 to the network device 120-2. The feedback procedure of the RACH in the CU-DU architecture report will be described with reference to FIG. 6.

By using the information indicated in the UE RACH report, network device 120 may control the network resources. For example, the network device 120 may use the received UE RACH Report to determine when 2-step or 4-step CBRA or CFRA RACH should be configured for the terminal device 110 or not. The network device 120 may further optimize its power ramping parameters separately for the PRACH and PUSCH (since fallback information indicates the successes of "MSGA" preambles and "MSGA" payload separately). The fallback information may also be used to configure 2-step RACH on BWPs where fallback is allowed, if too many 2-step RACH failures have occurred. Furthermore, the network device 120 may use the UE RACH report to collect statistics on the proportion of 2-step to 4-step RACH that have been successful. It can further collect statistics on the average number of messages needed until a RACH process (2-step, 4-step or 2-step with fallback) is successful.

For example, in this case, if the network device 120 receives the UE RACH report, the network device 120 may realize that the fallback is occurred because the number of "MSGA" transmissions exceeds the threshold number. The network device 120 may update the threshold for "MS GA" for example to a smaller value if 2-step RACH seems to be failing often. In this way, less retransmission opportunities are given to 2-step RACH which can decrease the delay until the RACH process is successful through falling back to 4-step RACH. In such a case, the RACH report may also indicate whether fallback occurred when operating at maximum power or at an offset lower than maximum power, and whether fallback occurred when preamble group A or B was used. Furthermore, the network device 120 may also adjust the power ramping parameters, the preamble type or the payload size for the "MSGA". Furthermore, the network device 120 may also adjust the power ramping parameters, the preamble type or the payload size for the "MSGA".

Figure 3:
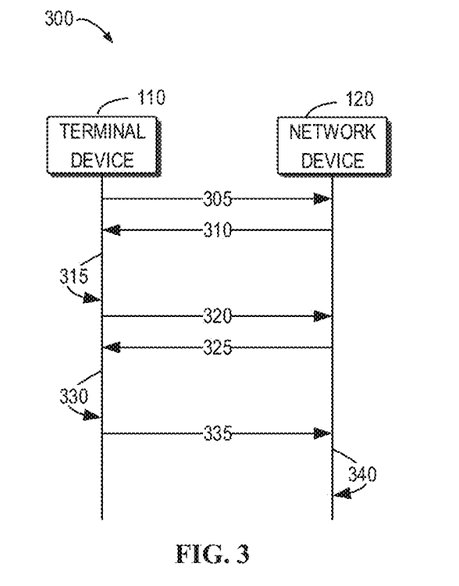
FIG. 3 shows a signaling chart illustrating a process of providing an enhanced report for RACH according to some example embodiments of the present disclosure.

FIG. 3 shows a signaling chart illustrating a process of providing an enhanced report for RACH according to some example embodiments of the present disclosure. For the purpose of discussion, the process 300 will be described with reference to FIG. 1. The process 300 may involve the terminal device 110 and the network device 120.

Similar with process 200 shown in FIG. 2, in process 300, the terminal device 110 may transmit 305 a "MSGA" to the network device 120 in a 2-step RA attempt. The terminal device 110 may log the transmission of "MSGA" after the "MSGA" is transmitted. This 2-step RA attempt may be the first RA attempt in a RA process. It is also possible that at least one previous 2-step RA attempt has been performed before this 2-step RA attempt.

If the network device 120 receives the preamble in the "MSGA", the network device 120 may transmit 310 a fallback RAR to the terminal device 110. The fallback RAR may indicate "MSGA" payload was not received successfully at network device 120. After receiving the fallback RAR, the terminal device 110 may determine that this 2-step RA attempt is to be changed to a 4-step RA attempt with further transmitting the a "MSG3" (e.g., instead of another "MSGA") to the network device 120.

For this case, the terminal device 110 may generate 315 an entry for the 2-step RA attempt. An example of the entry may be represented as "2-step CBRA, payload, fallback: fallback RAR, Beam index, #RACH attempts". This entry may reflect that the reason for the fallback is the reception of the fallback RAR from the network device 120.

The terminal device 110 may further transmit 320 a "MSG3" to the network device 120. If the transmission is successful, the network device 120 may transmit 325 a contention resolution message to indicate a success of the transmission.

If the terminal device 110 receives the message indicating the success of the transmission, the terminal device 110 may also determine 330 a further entry for the 4-step RA attempt. Thus, for the 4-step RA attempt, an example entry may be represented as "4-step CBRA, fallback: success, Beam index, RACH attempts, success".

Based on the entries determined in the RA process, the terminal device 110 may generate a report associated with the RA process. The terminal device 110 may transmit 335 the report to the network device 120. In some example embodiments, the terminal device 110 may transmit the report only when the network device 120 requires the report or when specific information is recorded in the report. The UE may log a number of RACH procedures before it indicates to the network device availability of a UE RACH Report so that the network device can request it. Correspondingly, the network device 120 may update 340 configuration information of the RA process based on the UE RACH report.

For example, in this case, if the network device 120 receives the UE RACH report, the network device 120 may realize that the fallback occurred because a fallback RAR response was received. In such a case, the UE RACH report may also indicate whether fallback occurred when operating at maximum power or an offset lower than maximum power, and whether fallback occurred when preamble group A or B was used. The network device 120 may also adjust the power ramping parameters, the preamble type, the payload size for the "MSGA" or the "MSGA" threshold.

Figure 4:
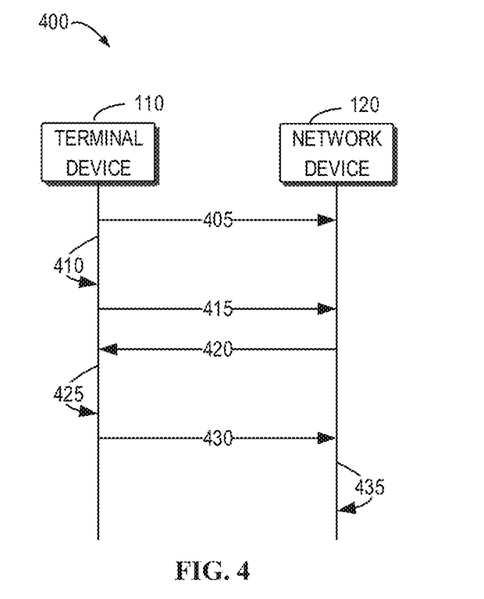
FIG. 4 shows a signaling chart illustrating a process of providing an enhanced report for RACH according to some example embodiments of the present disclosure.

FIG. 4 shows a signaling chart illustrating a process of providing an enhanced report for RACH according to some example embodiments of the present disclosure. For the purpose of discussion, the process 400 will be described with reference to FIG. 1. The process 400 may involve the terminal device 110 and the network device 120.

Similar with process 200 shown in FIG. 2, in process 400, the terminal device 110 may transmit 405 a "MSGA" to the network device 120 in a 2-step RA attempt. This 2-step RA attempt may be the first RA attempt in a RA process. It is also possible that at least one previous 2-step RA attempt has been performed before this 2-step RA attempt.

If the terminal device 110 cannot receive any response from the network device 120 after the transmission of the "MSGA", this 2-step RA attempt can be considered as a failed RA attempt.

In this case, the terminal device 110 may intend to change the 2-step RA attempt to a 4-step RA attempt. However, if the terminal device 110 determines that the 2-step RA attempt is configured on a BWP where 4-step RA attempt is not configured, the terminal device 110 may perform a subsequent 2-step RA attempt. For this situation, the terminal device 110 may determine 410 an entry for recording the 2-step RA attempt such as "2-step CBRA, payload, fallback: not support, Beam index, #RACH attempts", which may indicate that the 4-step RA attempt is not supported by the resources configured for the RA process.

For performing a subsequent 2-step RA attempt, the terminal device 110 may transmit 415 a "MSGA" to the network device 120. If the transmission is successful, the network device 120 may transmit 420 a contention resolution message to indicate a success of the transmission. If the terminal device 110 receives the message indicating the success of the transmission, the terminal device 110 may determine a success of the subsequent 2-step RA attempt and determine 425 a further entry for the subsequent 2-step RA attempt to indicate that no fallback is needed due to this success. An example of the further entry may be represented as "2-step CBRA, payload, fallback: success, Beam index, RACH attempts, success".

Based on the entries determined in the RA process, the terminal device 110 may generate a report associated with the RA process. The terminal device 110 may transmit 430 the UE RACH report to the network device 120. In some example embodiments, the terminal device 110 may transmit the report only when the network device 120 requires the report or specific information recorded in the report. The network device 120 may update 435 configuration information of the RA process based on the UE RACH report.

For example, in this case, if the network device 120 receives the UE RACH report, the network device 120 may realize that the fallback has not occurred because the 4-step RA attempt is not supported by the resources configured for the RA process. Thus, for example, the network device 120 may reconfigure the BWP for the RA process. Further, the network device 120 may also adjust the preamble type or the payload size for the "MSGA".

Figure 5:
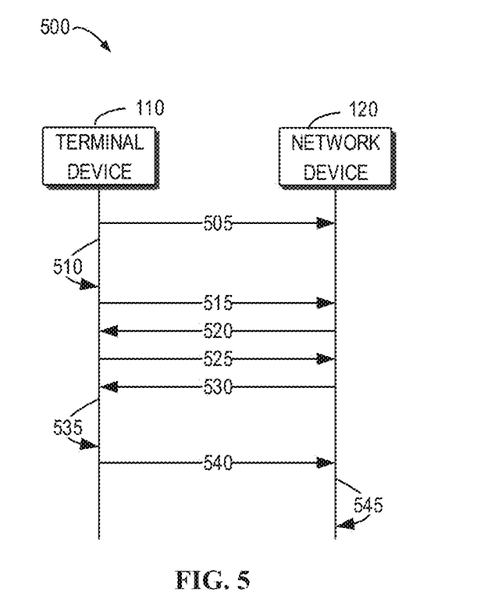
FIG. 5 shows a signaling chart illustrating a process of providing an enhanced report for RACH according to some example embodiments of the present disclosure.

FIG. 5 shows a signaling chart illustrating a process of providing an enhanced report for RACH according to some example embodiments of the present disclosure. For the purpose of discussion, the process 500 will be described with reference to FIG. 1. The process 500 may involve the terminal device 110 and the network device 120.

Similar with process 200 shown in FIG. 2, in process 500, the terminal device 110 may start 505 to transmit a "MSGA" to the network device 120 in a 2-step RA attempt. This 2-step RA attempt may be the first RA attempt in a RA process. It is also possible that at least one previous 2-step RA attempt has been performed before this 2-step RA attempt.

The terminal device 110 may initiate a LBT procedure for sensing a transmission occasion for transmitting the "MSGA. When the terminal device 110 initiates a LBT procedure, the terminal device 110 may log information about the LBT procedure. However, after a LBT process, the terminal device 110 may not be able to monitor any transmission opportunity for transmitting the "MSGA", and thereby consider this 2-step RA attempt as a failed RA attempt. The terminal device 110 then may determine a change of the type of RA attempt. For example, the 2-step RA attempt may be changed to the 4-step RA attempt.

For this situation, the terminal device 110 may determine 510 an entry for recording the 2-step RA attempt such as "2-step CBRA, payload, fallback: LBT, Beam index, #RACH attempts", which may indicate that the fallback has occurred because the terminal device 110 detects a LBT conflict.

A 4-step RA attempt may be initiated at the terminal device 110. The terminal device 110 may transmit 515 a "MSG1" If the terminal device 110 receives 520 a response, namely "MSG2", the terminal device 110 may transmit 525 a "MSG3" to the network device 120. If the transmission is successful, the network device 120 may transmit 530 a contention resolution message to indicate a success of the transmission.

If the terminal device 110 receives the message indicating the success of the random access, the terminal device 110 may determine 535 an entry for the 4-step RA attempt. An example of the entry may be represented as "4-step CBRA, fallback: success, Beam index, #RACH attempts, success".

Based on the entries determined in the RA process, the terminal device 110 may generate a report associated with the RA process. The terminal device 110 may further transmit 540 the report to the network device 120. In some example embodiments, the terminal device 110 may transmit the report only when the network device 120 requires the report or when specific information is recorded in the report. The UE may log a number of RACH procedures before it indicates to the network device availability of a UE RACH Report so that the network device can request it. The network device 120 may update 545 configuration information of the RA process based on the report.

For example, in this case, if the network device 120 receives the UE RACH report, the network device 120 may realize that the fallback has occurred because the terminal device 110 detects a LBT conflict. The network device 120 may adjust a backoff configuration for LBT. In such a case, the UE RACH report may also indicate whether fallback occurred when operating at maximum power or an offset lower than maximum power, and whether fallback occurred when preamble group A or B was used. Thus, the network device 120 may also adjust power ramping parameters.

The processes shown in FIGS. 2-5 show some embodiments in the RACH process. Specifically, with reference to FIGS. 2-5, some fallback cases and the generation of the UE RACH report associated with the different fallback situations has been explained in detail. Besides the fallback reason and fallback indication described above, the fallback may also occur when no suitable beam is found. This fallback reason may be applicable for a fallback operation from 4-step CFRA to 4-step CBRA fallback or for a fallback operation from 2-step CFRA to 2-step CBRA fallback.

Furthermore, for a regular 4-step RACH attempt, the fallback indication in the RACH may indicate "no fallback".

In this way, with the UE RACH report, the network device 120 may achieve a targeted optimization for the configuration of a RA process, which may improve the efficiency of the RA process and reduce overhead and/or other adverse effects due to repeated fallbacks.

As mentioned above, the network may support a CU-DU architecture. For such cases, the UE RACH report for a RA process to access a gNB-DU may be transmitted from the terminal device 110 to a gNB-CU. After the UE RACH report is forwarded from the gNB-CU to the gNB-DU, the gNB-DU may update the configuration.

Figure 6:
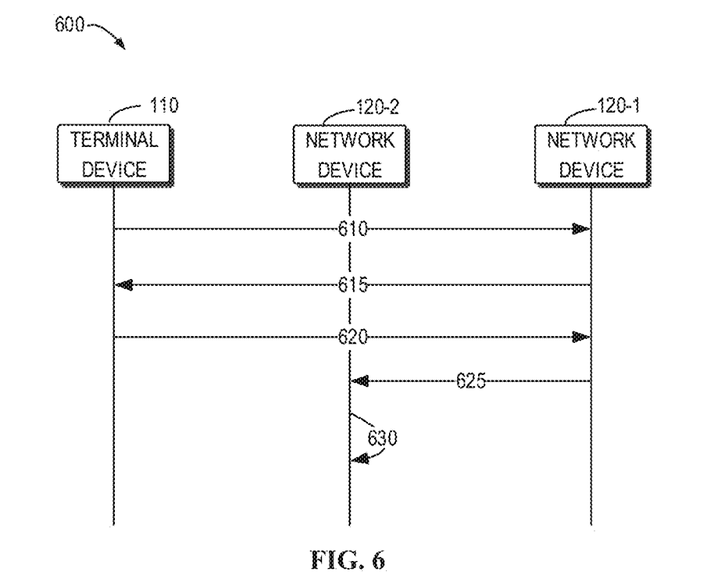
FIG. 6 shows a signaling chart illustrating a process of providing an enhanced report for RACH according to some example embodiments of the present disclosure.

FIG. 6 shows a signaling chart illustrating a process of providing an enhanced report for RACH according to some example embodiments of the present disclosure. For the purpose of discussion, the process 600 will be described with reference to FIG. 1. The process 600 may involve the terminal device 110 and the network devices 120-1 and 120-2, in which the network device 120-1 may be considered as a gNB-CU, and the network device 120-2 may be considered as a gNB-DU.

As shown in FIG. 6, the terminal device 110 may transmit 610 a message indicating an availability of the UE RACH report to the network device 120-1. If the network device 120-1 needs the UE RACH report, the network device 120-1 may transmit 615 a request for the UE RACH report to the terminal device 110.

In some example embodiments, the network device 120-1 may request fallback information in association with a RA process. In such cases, the network device 120-1 may generate a request for the profile associated with a fallback associated with the RA process.

After receiving the request, the terminal device 110 may transmit 620 the UE RACH report to the network device 120-1. Then the network device 120-1 may forward 625 the UE RACH report to the network device 120-2.

The network device 120-2 may maintain a counter of fallback information per SSB and per CSI-RS Index (depending on the beam where the RACH took place). By using the information indicated in the UE RACH report, network device 120-1 may update system information parameters pertaining to RACH access and forward this information to the network device 120-2. For example, the network device 120-2 may thus determine when 2-step or 4-step CBRA or CFRA RACH should be configured for the terminal device 110 or not. The network device 120-2 may further optimize its power ramping parameters separately for the PRACH and PUSCH (since fallback information indicates the successes of MSGA preambles and MSGA payload separately). The fallback information may also be used to configure 2-step RACH on BWPs where fallback is allowed, if too many 2-step RACH failures are occurred. The network device 120-2 may update 630 the configuration for the RA process based on the UE RACH report and system information received from network device 120-1. The update of the configuration has been explained with reference to FIGS. 2-5, thus the updating process may be omitted here.

Furthermore, the network device 120-2 may use the UE RACH report to collect statistics on the proportion of 2-step to 4-step RACH that have been successful. It can further collect statistics on the average number of messages needed until a RACH process (2-step, 4-step or 2-step with fallback) is successful.

Figure 7:
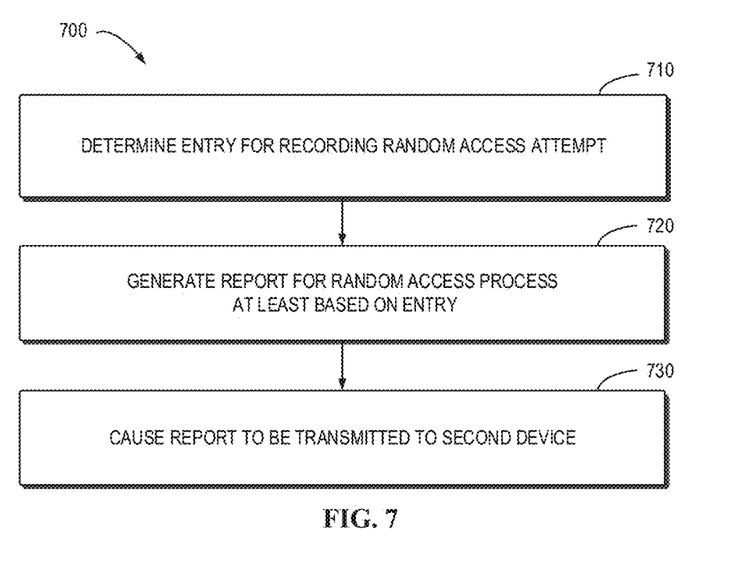
FIG. 7 shows a flowchart of an example method of providing an enhanced report for RACH according to some example embodiments of the present disclosure.

FIG. 7 shows a flowchart of an example method 700 of providing an enhanced report for RACH according to some example embodiments of the present disclosure. The method 700 can be implemented at a terminal device (e.g., the terminal device 110 described with reference to FIG. 1).

At 710, if the terminal device 110 determines that a random access attempt in a random access process for accessing a second device based on configuration information is performed, the terminal device 110 determines an entry for recording the random access attempt. The entry at least comprises fallback information indicating whether a change associated with the random access attempt has occurred.

In some example embodiments, the random access attempt is a 2-step random access attempt. If the terminal device determines the 2-step random access attempt is successful, the terminal device may record the fallback information to indicate a success of the 2-step random access attempt.

In some example embodiments, the random access attempt is a 2-step random access attempt. If the terminal device receives a random access response after transmitting a MSGA in the 2-step random access attempt, the terminal device may determine the random access attempt is to be changed to a 4-step random access attempt and record the fallback information indicating a reason for the change.

In some example embodiments, the random access attempt is a 2-step random access attempt, if the terminal device determines a transmission of a MSGA in the 2-step random access attempt is failed and the number of times that the MSGA having been transmitted exceeds a threshold number, the terminal device may determine the random access attempt is to be changed to a 4-step random access attempt and record the fallback information indicating a reason for the change.

In some example embodiments, the random access attempt is a 2-step random access attempt, if the terminal device determines a channel for a transmission of a MSGA in the 2-step random access attempt is unavailable, the terminal device may determine the random access attempt is to be changed to a 4-step random access attempt and record the fallback information indicating a reason for the change.

In some example embodiments, the random access attempt is a 2-step random access attempt, if the terminal device determines a failing to find a beam for the 2-step random access attempt, the terminal device may record the fallback information indicating a reason for the change.

In some example embodiments, the random access attempt is a 2-step random access attempt, if the terminal device determines a transmission of a MSGA in the 2-step random access attempt is failed and the 2-step random access attempt is not able to be changed to a 4-step random access attempt, the terminal device may record the fallback information indicating that the 4-step random access attempt is not supported on resources configured for the 2-step random access attempt.

In some example embodiments, the terminal device may determine process information comprising at least one of a type of the random access attempt, a type of contention mechanism for the random access attempt, a random access parameter of the random access attempt, an identifier of the random access attempt, an identifier of a beam on which the random access attempt is performed. The terminal device may determine the entry based on the process information and the fallback information.

In some example embodiments, the type of the random access attempt comprises one of a 2-step random access attempt, and a 4-step random access attempt.

In some example embodiments, the type of contention mechanism comprises one of a contention based random access attempt, and a contention-free random access attempt.

In some example embodiments, the random access attempt is a 2-step random access attempt, the random access parameter comprises at least one of a size of a payload transmitted in a MSGA in the random access attempt and a group type of a preamble for the random access attempt.

At 720, the terminal device generates a report for the random access process at least based on the entry.

In some example embodiments, if the terminal device determines the random access attempt failed, the terminal device may perform a further random access attempt in the random access process based on a fallback decision whether a type of the random access attempt is to be changed. If the terminal device determines the further random access attempt is complete, the terminal device may determine a further entry for the further random access attempt. The terminal device may generate the report based on the entry and the further entry.

At 730, the terminal device causes the report to be transmitted to the second device.

In some example embodiments, if the terminal device determines the random access process is successful, the terminal device may transmit a message indicating that an availability of the report to the second device. If the terminal device receives from a second device, a request for a profile associated with a fallback that occurred in the random access process, the terminal device may cause the fallback information as the report to be transmitted to the second device.

In some example embodiments, if the second device is a decentralized device, the terminal device may transmit the report to a third device, to cause the report to be forwarded from the third device to the decentralized device, the third device being a centralized device.

Figure 8:
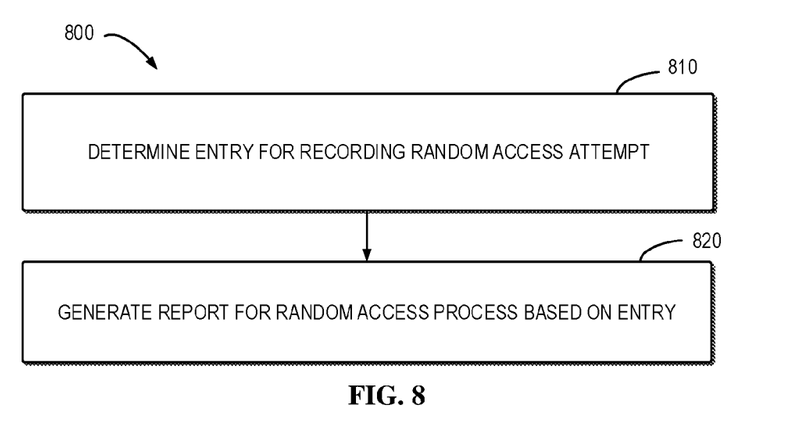
FIG. 8 shows a flowchart of an example method of providing an enhanced report for RACH according to some example embodiments of the present disclosure.

FIG. 8 shows a flowchart of an example method 800 of providing an enhanced report for RACH according to some example embodiments of the present disclosure. The method 800 can be implemented at the terminal device 110. The method 800 can be implemented at a terminal device (e.g., the terminal device described with reference to FIG. 1).

At 810, if the terminal device determines a random access attempt in a random access process for accessing a second device is performed, the terminal device determines an entry for recording the random access attempt. The entry may comprise at least one of a type of the random access attempt, a type of contention mechanism for random access attempt, at least one random access parameter of the random access attempt, an identifier of the random access attempt, an identifier of a beam on which the random access attempt is performed, and fallback information of the random access attempt.

At 820, the terminal device generates a report for the random access process based on the entry.

Figure 9:
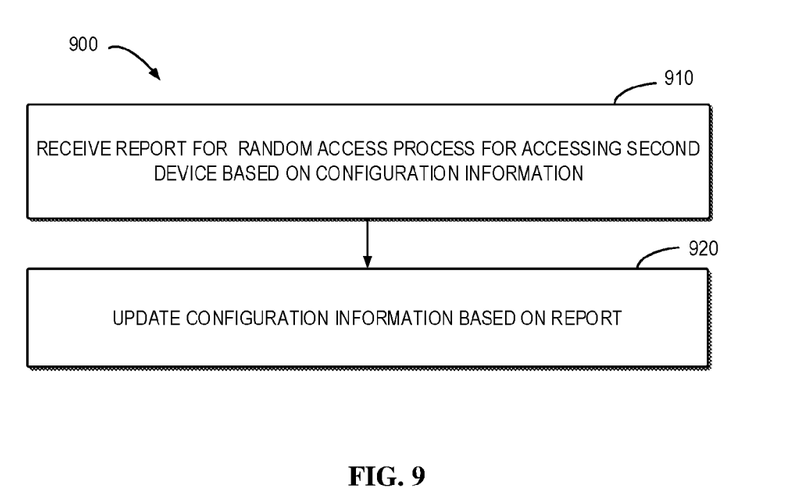
FIG. 9 shows a flowchart of an example method of providing an enhanced report for RACH according to some example embodiments of the present disclosure.

FIG. 9 shows a flowchart of an example method 900 of providing an enhanced report for RACH according to some example embodiments of the present disclosure. The method 900 can be implemented at a network device (e.g., the network device 120 described with reference to FIG. 1).

At 910, the network device 120 receives, from a first device, receive, from a first device, a report for a random access process perform at the first device for accessing the second device based on configuration information. The report may at least comprise an entry for recording a random access attempt in the random access process. The entry may at least comprise a fallback information indicating whether a change associated with the random access attempt has occurred.

At 920, the network device 120 updates the configuration information based on the report.

In some example embodiments, the network device 120 may obtain the fallback information from the report. If the terminal device determines from the fallback information, that the random access process is changed from a 2-step random access process to a 4-step random access process, the network device 120 may adjust a configuration parameter comprising at least one of a level of a power ramping, a type of a preamble, a type of group for a size of a MS GA; a threshold indicating the number of times that the MSGA allowed to be transmitted before a fallback to 4-step RACH and a backoff pattern for monitoring a channel for the random access process. The network device 120 may update the configuration information based on the adjusted configuration parameter.

In some example embodiments, the network device 120 may obtain the fallback information from the report. If the terminal device determines from the fallback information, that a 4-step random access process is not supported on resources configured for a 2-step random access process and the random access process is not able to be changed from a 2-step random access process to a 4-step random access process, the network device 120 may adjust a configuration parameter comprising at least one of a band width part for the random access process; a level of a power ramping, and a type of group for a size of MSGA. The network device 120 may update the configuration information based on the adjusted configuration parameter.

In some example embodiments, if the network device 120 receives, from the first device, a message indicating an availability of the report, the network device 120 may generate a request for a profile associated with a fallback occurred in the random access process. The network device 120 may transmit the request to the first device.

In some example embodiments, the second device being a decentralized device, the network device 120 may receive the report via a third device, the third device being a centralized device.

In some example embodiments, an apparatus capable of performing the method 700 (for example, the terminal device 110) may comprise means for performing the respective steps of the method 700. The means may be implemented in any suitable form. For example, the means may be implemented in a circuitry or software module.

In some example embodiments, the apparatus comprises means for in accordance with a determination that a random access attempt in a random access process for accessing a second device based on configuration information is performed, determining an entry for recording the random access attempt, the entry at least comprising fallback information indicating whether a change associated with the random access attempt has occurred; means for generating a report for the random access process at least based on the entry; and means for causing the report to be transmitted to the second device.

In some example embodiments, an apparatus capable of performing the method 800 (for example, the terminal device 110) may comprise means for performing the respective steps of the method 800. The means may be implemented in any suitable form. For example, the means may be implemented in a circuitry or software module.

In some example embodiments, the apparatus comprises means for in accordance with a determination that a random access attempt in a random access process for accessing a second device is performed, determining an entry for recording the random access attempt, the entry comprising at least one of the following: a type of the random access attempt, a type of contention mechanism for random access attempt, at least one random access parameter of the random access attempt, an identifier of the random access attempt, an identifier of a beam on which the random access attempt is performed and fallback information of the random access attempt, and means for generating a report for the random access process based on the entry.

In some example embodiments, an apparatus capable of performing the method 900 (for example, the network device 120) may comprise means for performing the respective steps of the method 900. The means may be implemented in any suitable form. For example, the means may be implemented in a circuitry or software module.

In some example embodiments, the apparatus comprises means for receiving, from a first device, a report for a random access process perform at the first device for accessing the second device based on configuration information, the report at least comprising an entry for recording a random access attempt in the random access process, the entry at least comprising a fallback information indicating whether a change associated with the random access attempt has occurred; and means for updating the configuration information based on the report.

Figure 10:
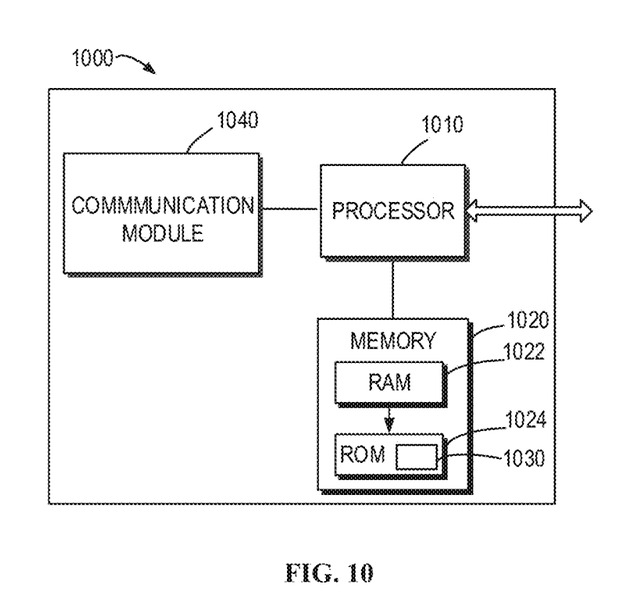
FIG. 10 shows a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement the communication device, for example the terminal device 110 and the network device 120 as shown in FIG. 1. As shown, the device 1000 includes one or more processors 1010, one or more memories 1040 coupled to the processor 1010, and one or more transmitters and/or receivers (TX/RX) 1040 coupled to the processor 1010.

The TX/RX 1040 is for bidirectional communications. The TX/RX 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The embodiments of the present disclosure may be implemented by means of the program 1030 so that the device 1000 may perform any process of the disclosure as discussed with reference to FIGS. 2-9. The embodiments of the present disclosure may also be implemented by hardware or by a combination of software and hardware.

Figure 11:
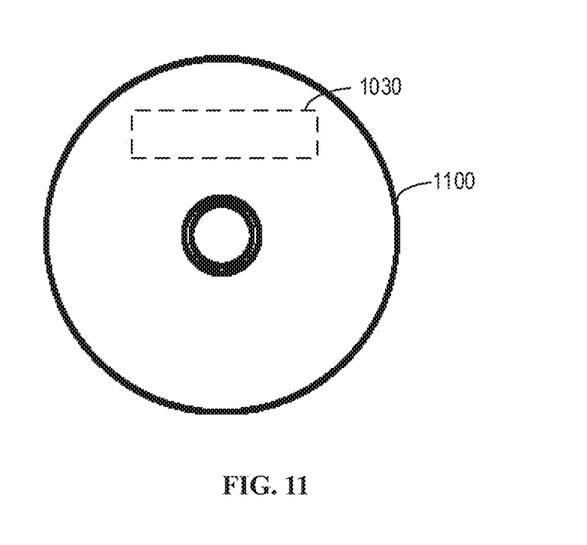
FIG. 11 shows a block diagram of an example computer readable medium in accordance with some embodiments of the present disclosure.

In some embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700-900 as described above with reference to FIGS. 7-9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes are configured to, with the at least one processor, cause the first device at least to:
in accordance with a determination that a random access attempt in a random access process for accessing a second device based on configuration information is performed, determine an entry for recording the random access attempt, the entry at least comprising fallback information indicating whether a change associated with the random access attempt has occurred;
generate a report for the random access process at least based on the entry; and
cause the report to be transmitted to the second device, wherein the random access attempt is a 2-step random access attempt, and wherein the first device is further caused to:
in accordance with a determination that a transmission opportunity for a transmission of a MSGA in the 2-step random access attempt is unavailable due to a listen before talk (LBT) conflict, determine the random access attempt is to be changed to a 4-step random access attempt; and
record the fallback information indicating the LBT conflict as a reason for the change.

2. The first device of claim 1, wherein the random access attempt is a 2-step random access attempt, and wherein the first device is further caused to:
in accordance with a determination that the 2-step random access attempt is successful, record the fallback information to indicate a success of the 2-step random access attempt.

3. The first device of claim 1, wherein the random access attempt is a 2-step random access attempt, and wherein the first device is further caused to:
in response to receiving a random access response after transmitting a MSGA in the 2-step random access attempt, determine the random access attempt is to be changed by resuming a MSG3 transmission; and
record the fallback information indicating a reason for the change.

4. The first device of claim 1, wherein the random access attempt is a 2-step random access attempt, and wherein the first device is further caused to:
in accordance with a determination that a transmission of a MSGA in the 2-step random access attempt is failed and the number of times that the MSGA having been transmitted exceeds a threshold number, determine the random access attempt is to be changed to a 4-step random access attempt; and
record the fallback information indicating a reason for the change.

5. The first device of claim 1, wherein the random access attempt is a 2-step random access attempt, and wherein the first device is further caused to:
in accordance with a determination that a transmission of a MSGA in the 2-step random access attempt is failed and the 2-step random access attempt is not able to be changed to a 4-step random access attempt, record the fallback information indicating that the 4-step random access attempt is not supported on resources configured for the 2-step random access attempt.

6. The first device of claim 1, wherein the first device is caused to determine the entry by:
determining process information comprising at least one of the following:
a type of the random access attempt,
a type of contention mechanism for random access process,
a random access parameter of the random access attempt,
an identifier of the random access attempt, and
an identifier of a beam on which the random access attempt is performed; and
determining the entry based on the process information and the fallback information.

7. The first device of claim 6, wherein the type of the random access attempt comprises one of the following:
a 2-step random access attempt, and
a 4-step random access attempt.

8. The first device of claim 6, wherein the type of contention mechanism comprises one of the following:
a contention based random access attempt, and
a contention free random access attempt.

9. The first device of claim 6, wherein the random access attempt is a 2-step random access attempt, the random access parameter comprises at least one of the following:
a size of a payload transmitted in a MSGA for the random access process, and
a group type of a preamble for the random access process.

10. The first device of claim 1, wherein the first device is caused to generate the report by:
in accordance to a determination that the random access attempt is failed, performing a further random access attempt in the random access process based on a fallback decision whether a type of the random access attempt is to be changed;
in accordance to a determination that the further random access attempt is complete, determining a further entry for the further random access attempt; and
generating the report based on the entry and the further entry.

11. The first device of claim 1, wherein the first device is caused to cause the report to be transmitted by:
in accordance with a determination that the random access process is successful, transmitting a message indicating that an availability of the report to the second device;
in response to receiving, from a second device, a request for a profile associated with a fallback occurred in the random access process, causing the fallback information as the report to be transmitted to the second device.

12. The first device of claim 1, wherein the second device is a decentralized device, and wherein the first device is further caused to:
transmit the report to a third device, to cause the report to be forwarded from the third device to the decentralized device, the third device being a centralized device.

13. A first device comprising:
at least one processor; and
at least one memory including computer program codes;
the at least one memory and the computer program codes are configured to, with the at least one processor, cause the first device at least to:
in accordance with a determination that a random access attempt in a random access process for accessing a second device based on configuration information is performed, determine an entry for recording the random access attempt, the entry at least comprising fallback information indicating whether a change associated with the random access attempt has occurred;
generate a report for the random access process at least based on the entry; and
cause the report to be transmitted to the second device, and
wherein the random access attempt is a 2-step random access attempt, and wherein the first device is further caused to:
in accordance with a determination that failing to find a beam for the 2-step random access attempt, determine the random access attempt is to be changed to a 4-step random access attempt; and
record the fallback information indicating failed preamble transmission as a reason for the change.

14. The first device of claim 13, wherein the random access attempt is a 2-step random access attempt, and wherein the first device is further caused to:
in accordance with a determination that the 2-step random access attempt is successful, record the fallback information to indicate a success of the 2-step random access attempt.

15. The first device of claim 13, wherein the random access attempt is a 2-step random access attempt, and wherein the first device is further caused to:
in response to receiving a random access response after transmitting a MSGA in the 2-step random access attempt, determine the random access attempt is to be changed by resuming a MSG3 transmission; and
record the fallback information indicating a reason for the change.

16. The first device of claim 13, wherein the random access attempt is a 2-step random access attempt, and wherein the first device is further caused to:
in accordance with a determination that a transmission of a MSGA in the 2-step random access attempt is failed and the number of times that the MSGA having been transmitted exceeds a threshold number, determine the random access attempt is to be changed to a 4-step random access attempt; and
record the fallback information indicating a reason for the change.

17. The first device of claim 13, wherein the random access attempt is a 2-step random access attempt, and wherein the first device is further caused to:
in accordance with a determination that a transmission of a MSGA in the 2-step random access attempt is failed and the 2-step random access attempt is not able to be changed to a 4-step random access attempt, record the fallback information indicating that the 4-step random access attempt is not supported on resources configured for the 2-step random access attempt.

18. The first device of claim 13, wherein the first device is caused to determine the entry by:
determining process information comprising at least one of the following:
a type of the random access attempt,
a type of contention mechanism for random access process,
a random access parameter of the random access attempt,
an identifier of the random access attempt, and
an identifier of a beam on which the random access attempt is performed; and
determining the entry based on the process information and the fallback information.

19. The first device of claim 18, wherein the type of the random access attempt comprises one of the following:
a 2-step random access attempt, and
a 4-step random access attempt.

20. The first device of claim 18, wherein the type of contention mechanism comprises one of the following:
a contention based random access attempt, and
a contention free random access attempt.

21. The first device of claim 18, wherein the random access attempt is a 2-step random access attempt, the random access parameter comprises at least one of the following:
a size of a payload transmitted in a MSGA for the random access process, and
a group type of a preamble for the random access process.

22. The first device of claim 13, wherein the first device is caused to generate the report by:
in accordance to a determination that the random access attempt is failed, performing a further random access attempt in the random access process based on a fallback decision whether a type of the random access attempt is to be changed;
in accordance to a determination that the further random access attempt is complete, determining a further entry for the further random access attempt; and
generating the report based on the entry and the further entry.

23. The first device of claim 13, wherein the first device is caused to cause the report to be transmitted by:
in accordance with a determination that the random access process is successful, transmitting a message indicating that an availability of the report to the second device;
in response to receiving, from a second device, a request for a profile associated with a fallback occurred in the random access process, causing the fallback information as the report to be transmitted to the second device.

24. The first device of claim 13, wherein the second device is a decentralized device, and wherein the first device is further caused to:
transmit the report to a third device, to cause the report to be forwarded from the third device to the decentralized device, the third device being a centralized device.

* * * * *